(12) United States Patent
Dutertre

(10) Patent No.: US 10,405,495 B2
(45) Date of Patent: Sep. 10, 2019

(54) SCRAPER STRIP FOR A SCRAPER DEVICE

(71) Applicant: Deere & Company, Moline, IL (US)

(72) Inventor: Matthieu Dutertre, Chemaudin (FR)

(73) Assignee: DEERE & COMPANY, Moline, IL (US)

( * ) Notice: Subject to any disclaimer, the term of this patent is extended or adjusted under 35 U.S.C. 154(b) by 319 days.

(21) Appl. No.: 15/214,506

(22) Filed: Jul. 20, 2016

(65) Prior Publication Data

US 2017/0020076 A1   Jan. 26, 2017

(30) Foreign Application Priority Data

Jul. 22, 2015  (DE) .......................... 10 2015 213 854

(51) Int. Cl.
| | |
|---|---|
| *A01F 15/07* | (2006.01) |
| *B08B 1/02* | (2006.01) |
| *B65G 45/12* | (2006.01) |
| *A01F 15/18* | (2006.01) |
| *B08B 1/00* | (2006.01) |

(52) U.S. Cl.
CPC .............. *A01F 15/07* (2013.01); *A01F 15/18* (2013.01); *B08B 1/005* (2013.01); *B08B 1/02* (2013.01); *B65G 45/12* (2013.01); *A01F 2015/186* (2013.01)

(58) Field of Classification Search
CPC ........ A01F 15/106; A01F 15/07; A01F 15/18; A01F 2015/186; B08B 1/005; B08B 1/02; B65G 45/12; B65G 45/14; B65G 45/16; A47L 13/08; D21G 3/005; B30B 3/04
USPC ......... 100/88, 174; 56/364; 15/93.1, 256.51, 15/236.1, 93.4
See application file for complete search history.

(56) References Cited

U.S. PATENT DOCUMENTS

| | | | | |
|---|---|---|---|---|
| 3,270,418 | A | * | 9/1966 | Simeone .................... F41G 1/28 42/136 |
| 4,436,027 | A | * | 3/1984 | Freimuth ................. A01F 15/07 100/174 |
| 4,633,659 | A | | 1/1987 | Anstey et al. |
| 5,191,833 | A | | 3/1993 | Clevenger |

FOREIGN PATENT DOCUMENTS

| | | |
|---|---|---|
| CA | 2547896 A1 | 6/2005 |
| DE | 29515629 U1 | 12/1995 |
| GB | 2143792 A | 2/1985 |

OTHER PUBLICATIONS

Translation of the European Search Report in foreign counterpart application No. 16179651.1, dated Oct. 17, 2016 (8 pages).

* cited by examiner

*Primary Examiner* — Elaine Gort
*Assistant Examiner* — Christopher B Wehrly

(57) ABSTRACT

A scraper strip for a scraper device including at least one adjusting disk positioned in a recess of the scraper strip and rotatably attached to a scraper strip support, the adjusting disk comprising an eccentric guide track, which extends in a spiral shape or at least approximately as a circle involute, from a region at least close to a center point of the at least one adjusting disk in the direction of an edge region of the adjusting disk, and so as to linearly displace the scraper strip with respect to the scraper strip support of the scraper device when the adjusting disk is rotated. A fastener is accommodated by a groove extending substantially in a displacement direction of the scraper strip such that the scraper strip is displaced with respect to the fastener.

17 Claims, 4 Drawing Sheets

SCRAPER STRIP FOR A SCRAPER DEVICE

CROSS-REFERENCE TO RELATED APPLICATIONS

Pursuant to 35 USC § 119, this application claims the benefit of and priority to German patent application no. 102015213854.2, filed on Jul. 22, 2015, which is herein incorporated by reference in its entirety.

FIELD OF THE DISCLOSURE

The present disclosure relates to a scraper strip for a scraper device and to a scraper device for reducing adhesions on a roller, which interacts with a bale, of an agricultural round baler. The present disclosure further relates to an agricultural round baler for producing round bales.

BACKGROUND

Known scraper devices are often used on round balers having moving parts, which come into contact with baling material to be processed by the round balers. The scraper devices includes scraper strips, which interact with the moving parts of the round baler in order to counteract adhesions of baling material and other material, such as mud, dirt, baling material residue, etc., to prevent same, or to remove existing adhesions or deposits. The moving parts are often one or multiple rotatable rollers. Scraper devices are also known, however, which interact in a corresponding manner with straps or belts of a round baler.

Such round balers are used in agricultural as well as industrial applications. Corresponding agricultural round balers are used, for example, for forming crop bales, for example, in the form of round bales, and often generate at least substantially round-cylindrical bales from crop material, for example, in the form of straw, hay, chopped material, etc. Industrial round balers are used for compacting rubbish, textiles, or other substances or for pressing same into bales.

Scraper devices usually include a scraper strip and a scraper strip support, wherein the scraper strip is held on the scraper strip support, which can be provided, for example, on a frame or on a housing of a round baler, by fastening means, for example, in the form of screw fittings. Since scraper strips are usually provided in order to remove adhesions from moving parts, such as rollers or belts, or to prevent or counteract a build-up of adhesions, a spacing distance must be provided between the roller and the scraper strip, which is suitable for this task and is usually as small as possible. If the scraper strip wears during use, or if the machine settings and/or harvesting conditions change, or if a different scraper strip or a new scraper strip is installed, it may be necessary to change or adjust the spacing distance thereof. In order to ensure a good function of the scraper bar, the spacing distance of the scraper strip from the roller should be at least approximately the same, along the entire width. To this end, it is known to loosen the fastening means connecting the scraper strip and the scraper strip support, which means are usually designed in the form of screw fittings, and to displace the scraper strip. Such an adjustment is complicated and can require several readjustments.

SUMMARY

A problem to be solved can be considered that of providing a scraper strip, a scraper device, and a corresponding agricultural round baler of the initially described type, by means of which the aforementioned disadvantages are overcome.

The problem is solved at least by the teaching of claims 1, 5, and 8. Further advantageous embodiments and refinements will become apparent from the dependent claims.

A scraper strip for a scraper device is disclosed, which strip includes at least one rotatable control device for linearly displacing the scraper strip with respect to a scraper strip support, wherein the scraper strip has at least one guide groove extending substantially in the displacement direction of the scraper strip, in which groove a stationary guide means can be accommodated in such a way that the scraper strip can be displaced with respect to the guide means. If a scraper strip for an above-described scraper device has a rotatable adjusting means for linearly guiding the scraper strip with respect to the scraper strip support, this can simplify a displacement or adjustment of the scraper strip. The adjusting means is supported so as to be rotatable with respect to the scraper strip, and can be rotatably accommodated in a recess of the scraper strip.

In order to support a uniform displacement, the adjusting means can include means for displacing the scraper strip along an eccentric guide track. The eccentric guide track can extend in a spiral shape, in particular at least approximately as a circle involute, from a region at least close to a centre point M of the adjusting means in the direction of an edge region of the adjusting means, or said guide track can be determined by a slot. In this manner, a uniform motion of the scraper strip and, therefore, a simple spacing adjustment of the scraper strip and the moving component can be achieved and supported.

It is particularly favorable when the adjusting means is supported so as to be rotatable with respect to the scraper strip, wherein the adjusting means is rotatably accommodated in a recess of the scraper strip. In this case, the adjusting means can be designed in the form of an adjusting disk having a circular cross section and/or having a thickness substantially corresponding to a thickness of the scraper strip.

In some embodiments, at least two adjusting means are provided, which are disposed with mirror symmetry with respect to a longitudinal axis of the scraper strip. With regard for a uniform guidance of the scraper strip along its entire width or with regard for the uniform adjustment of a spacing distance or gap between the scraper strip and the moving part, it is particularly favorable to provide two or more adjusting means.

A scraper device for reducing adhesions on a moving component of an agricultural round baler, in particular a roller interacting with a bale, includes a scraper strip, a scraper strip support, and at least one fastening means for connecting the scraper strip to the scraper strip support. Moreover, if at least one rotatable adjusting means is provided, which is suitable for linearly guiding the scraper strip with respect to the scraper strip support, a linear displacement of the scraper strip, which is as controlled as possible, with respect to the scraper device or the scraper strip support can be easily achieved and a spacing distance between the scraper strip and the moving component can be adjusted. It is conceivable to rotate the adjusting means for this purpose and to effectuate a linear movement of the scraper strip via the rotation of the adjusting means. It is also possible, however, that a movement of the scraper strip is linearly guided by the rotatable adjusting means. If at least one substantially stationary guide means is provided, which is displaceably accommodated in a guide groove extending at least substantially in a displacement direction of the scraper strip, the rotary guidance of the adjusting means can be easily superimposed on a linear guidance of the guide means in order to therefore achieve a controlled movement of the scraper strip, so that the scraper strip can be displaced with respect to the stationary guide means, wherein the scraper strip is linearly displaced with respect to the scraper strip support by rotating the at least one rotatable adjusting means. A displacement can be carried out manually as well as by means of a motor, and an automatic displacement is also conceivable. The moving component can be, for example, a rotatable roller. It is also conceivable, however, that this is a revolving component, for example, such as a strap or a belt. Other embodiments of the moving component are also conceivable.

If a guide means interacting with the adjusting means is provided, this guide means can be provided in a substantially stationary manner on the scraper strip support or on the scraper strip. The guide means is determined by the fastening means, in particular by a screw connecting the scraper strip to the scraper strip support, whereby the number of components can be kept low. It is also conceivable, however, to provide such a guide means independently of the fastening means, for example in the manner of a pin mounted on the scraper strip or on the scraper strip support in a fixed or detachable manner, for example, by means of a thread.

It is conceivable that the adjusting means is supported so as to be rotatable with respect to the scraper strip or the scraper strip support. If the adjusting means is rotatably accommodated in a recess of the scraper strip, however, no further fastening means are necessary. Instead, the adjusting means can be easily inserted into a recess in the scraper strip during an assembly of the scraper device or during an installation of a scraper strip on the scraper strip support. Optionally, it is also conceivable, however, to provide securing means, which can prevent, for example, the adjusting disk from falling out during installation. With respect to a rotatable accommodation of the guide means to design said means in the form of an adjusting disk having a substantially circular cross section. If the adjusting means or the adjusting disk alternatively or additionally has a thickness corresponding at least substantially to the thickness of the scraper strip, it can fit into the scraper strip and, for example, provide a smaller working surface for soiling or wear.

With regard for uniform guidance of the scraper strip along its entire width or for the uniform adjustment of a spacing distance or gap between the scraper strip and the moving part, it is particularly favorable to provide two or more adjusting means. Particularly uniform guidance can be achieved when these adjusting means are disposed with at least substantial mirror symmetry with respect to a longitudinal axis of the scraper device or the scraper strip with respect to the direction of use of the round baler. In this manner, tilting can also be counteracted.

In some embodiments, the scraper strip includes a guide groove extending at least substantially in the displacement direction of the scraper strip, in which groove an at least substantially stationary guide means can be displaceably accommodated.

In some embodiments, the adjusting means also includes means for guiding the scraper strip along an eccentric guide track. The guide track can extend in a spiral shape, in particular at least approximately as a circle involute from a center point M of the adjusting means in the direction of an edge region of the adjusting means and/or is determined by a slot.

If a round baler, for example an agricultural or industrial round baler for producing round bales, having at least one moving component, for example a roller acting on a bale, includes a scraper device having the above-described features, this can improve the handling of the round baler in that, if necessary, an improved and/or simplified displacement or adjustment of the scraper strip with respect to the moving component is made possible.

The disclosure and further advantages and advantageous refinements of the disclosure and embodiments of the disclosure are described and explained in greater detail in the following with reference to the drawing, which shows an exemplary embodiment of the disclosure.

DETAILED DESCRIPTION

Figure 1:
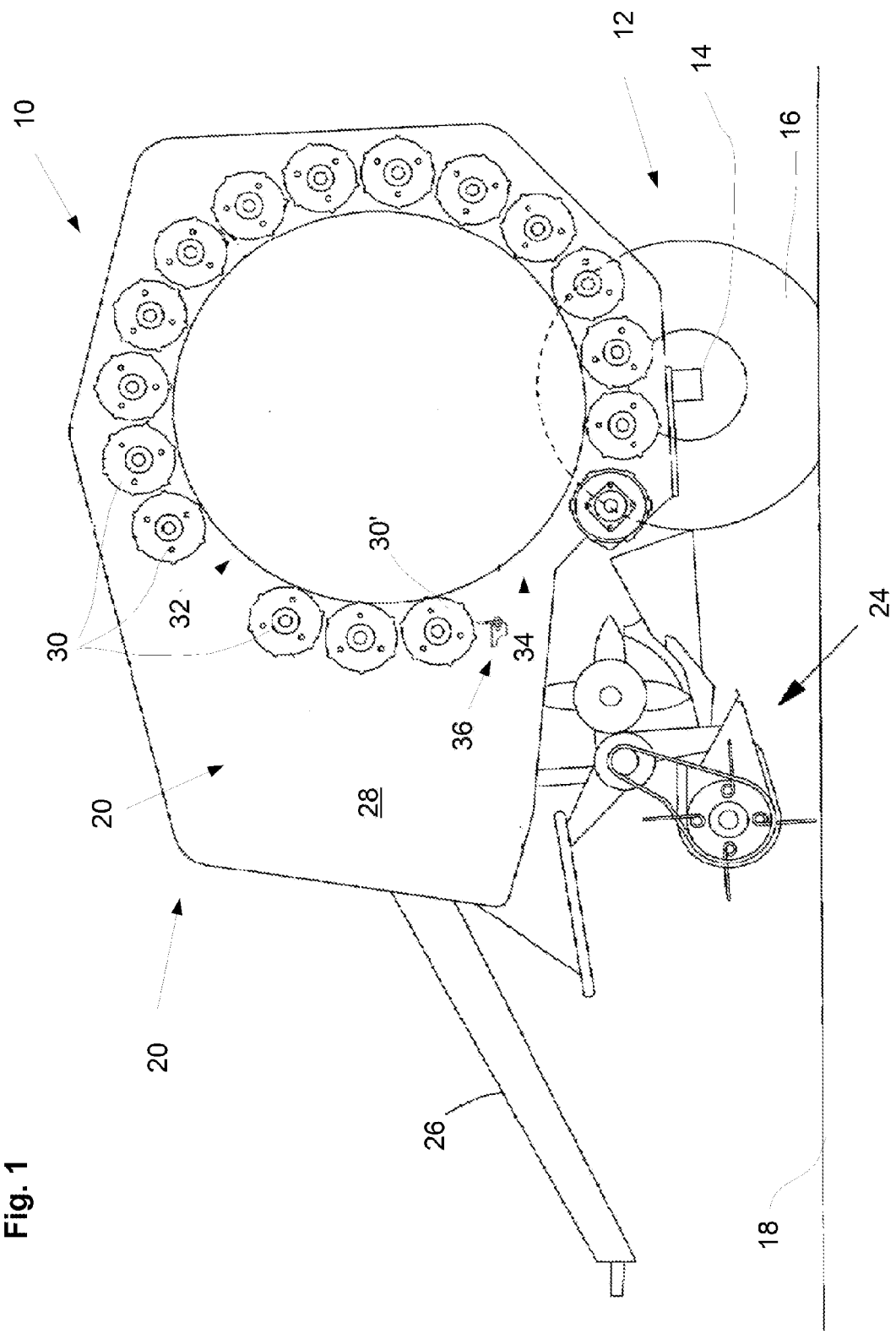
FIG. 1 shows a side view of a round baler including a scraper device.

FIG. 1 shows a round baler 10 for generating a pressed product in the form of a bale 12. The baler shown is designed in the form of a round baler and can be used in agricultural and industrial applications for producing a bale, which is round-cylindrical, in particular, and is usually referred to as a round bale, of crop material but also of rubbish, paper, cloth or woven fabric, cotton, tobacco, etc. Such a round baler 10 can be drawn by a non-illustrated working vehicle, for example a tractor, or can be designed to be self-propelled.

The round baler 10 includes a vehicle frame 12, which is supported on the ground 18 via an axle 14 having wheels 16, a housing 20 having side panels 22, a crop feeding device 24, and a drawbar 26, by means of which the round baler 10 can be connected to the non-illustrated working vehicle.

A bale chamber 28 is provided within the housing 20, which chamber extends between the two side panels 22 and is enclosed by a plurality of rollers 30, which are situated at least substantially on a circle, wherein the rollers 30, in the front region of the round baler 10, leave an upper gap 32 for a non-illustrated twine wrap device and a lower gap 34 for the crop feeding device 24.

A scraper device 36 is assigned to a roller 30' situated above the lower gap 34, which scraper device includes a scraper strip support 38 and a scraper strip 40.

Figure 2:
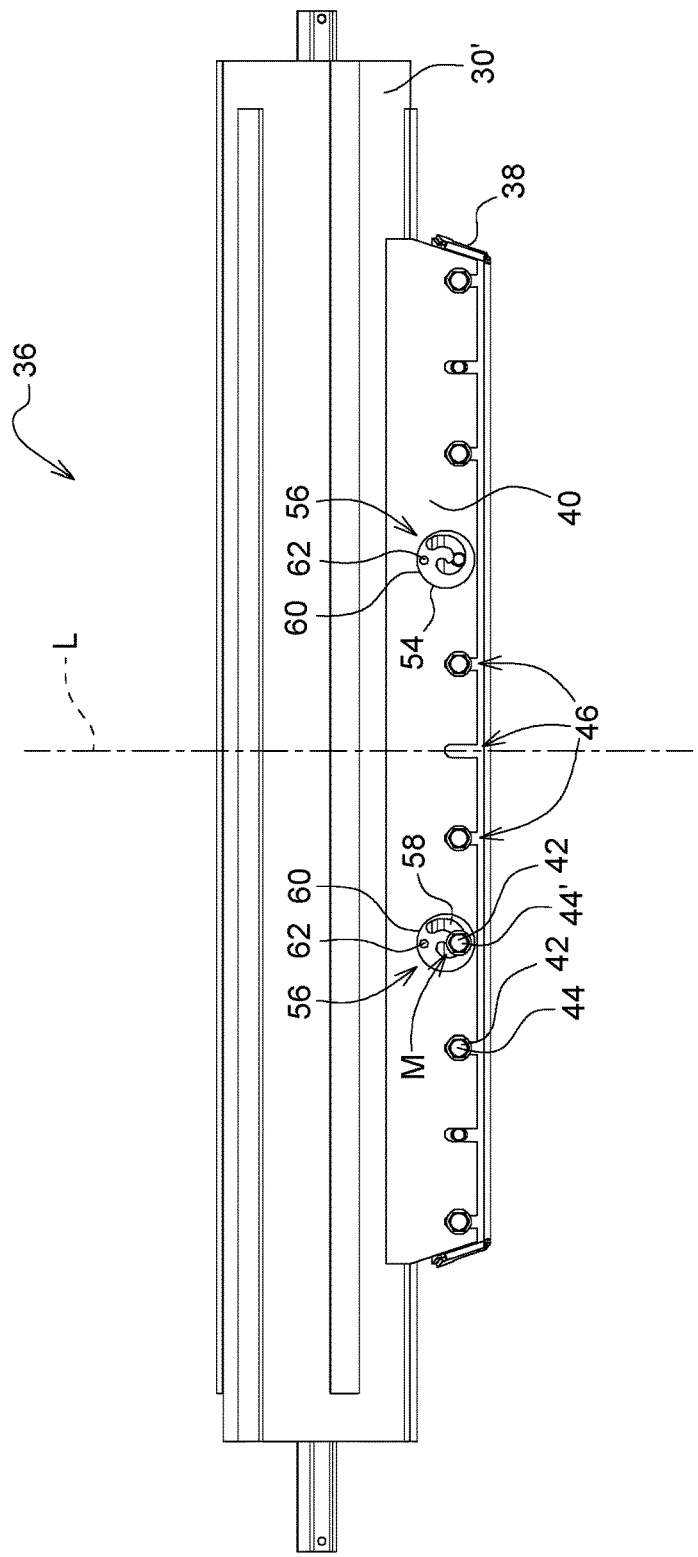
FIG. 2 shows a view of a roller, which is situated above a lower gap, of the round baler according to FIG. 1, which baler includes a scraper device assigned to the roller.
Figure 3:
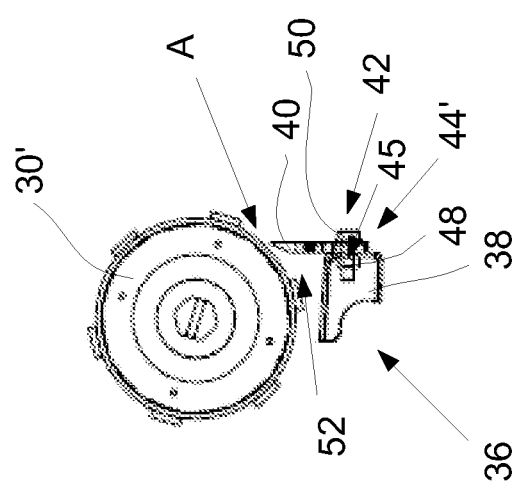
FIG. 3 shows a side view of the roller and the scraper device according to FIG. 2.
Figure 4:
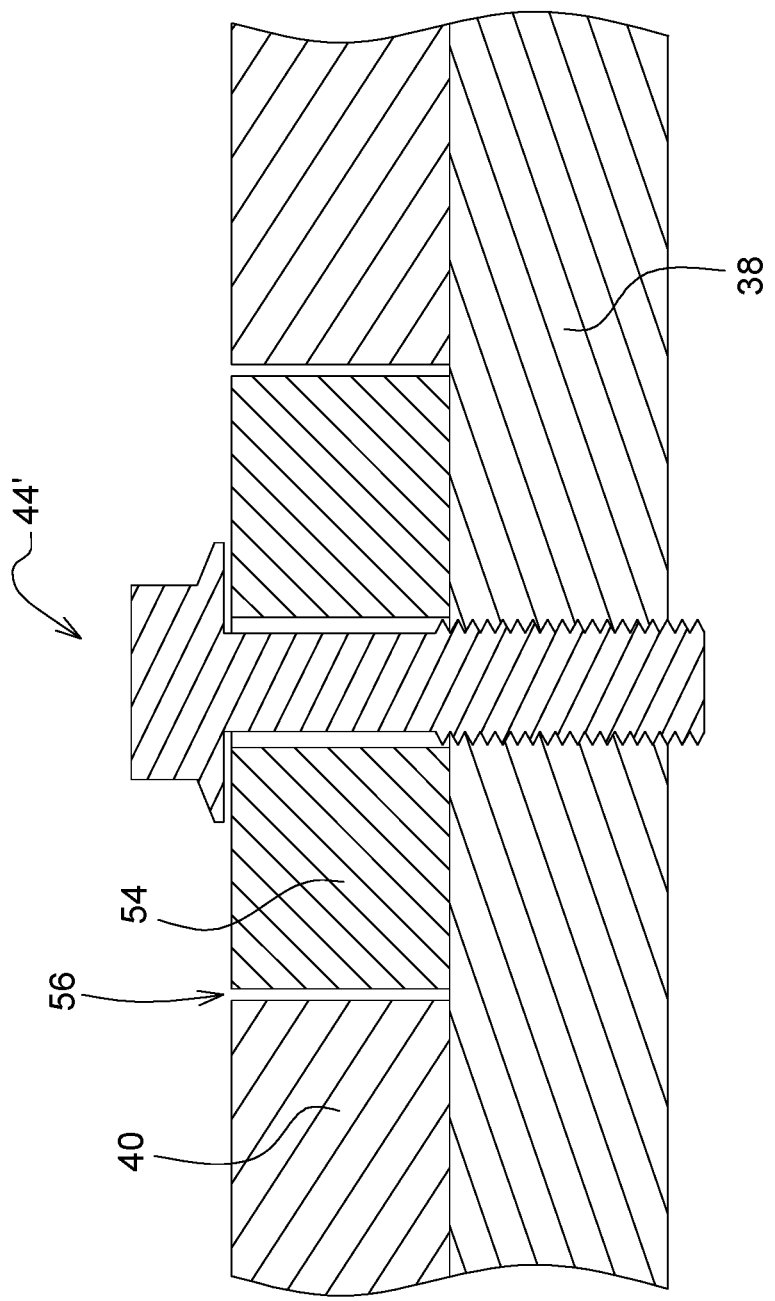
FIG. 4 shows a cross-sectional view of the adjusting disk, scraper strip, scraper strip support, and screw.

Reference is now made to FIGS. 2, 3, and 4 in which the roller 30', the scraper strip support 38, and the scraper strip 40 are shown in greater detail. The scraper strip 40 can be displaceably fixed on the scraper strip support 38 by means of fastening means 42. The fastening means 42 can be designed in the form of screws 44, for example hexagon head screws, which at least substantially fixedly hold the scraper strip 40 on the scraper strip support 38 in the operating state, for example, in that said fastening means extend through openings 45 (merely indicated) in the scraper strip support 38 and engage in guide grooves 46, which are open at one end, in the scraper strip 40, in order to interact with nuts 48, which are disposed on a side 52 of the scraper strip support 38 opposite a screw head 50 of the screws 44. For improved clarity, the screw 44 on the right in FIG. 2 is shown without its hexagonal screw head 50. For the purpose of changing or setting a spacing distance A between the scraper strip 40 and the roller 30', the fastening means 42 can be loosened, for example the screws 44 can be loosened with respect to the particular nut 48. As an alternative, it is conceivable that the fastening means 42 interact with the scraper strip support 38 in such a way that the screws 44 engage into threads (not illustrated) provided in the scraper strip support 38.

In addition, adjusting means 54 designed as adjusting disks are provided, which adjusting means are freely rotatably accommodated in circular recesses 56 of the scraper strip 40; in particular, said adjusting means are inserted into the scraper strip 40. Alternatively, the adjusting means 54 can also be rotatably fastened on the scraper strip 40 in any other manner. According to the exemplary embodiment depicted in the drawing, two adjusting means 54 having a circular cross section are provided, which adjusting means are disposed with mirror symmetry with respect to a longitudinal axis L—relative to the operating direction of the round baler 10—of the scraper strip 40, and are each correspondingly assigned to one of the guide grooves 46. The adjusting means 54 are designed substantially in the form of a flat cylindrical body or are designed as a type of disk and have approximately the same thickness as the scraper strip 40.

The adjusting means 54 have slots 58 extending therethrough, which slots—with respect to a centre point M of the particular adjusting means 54—assume at least substantially the shape of a spiral or a circle involute, which extends from the centre point M to an edge region 60 of the adjusting means 54.

If the scraper strip 40 is mounted on the scraper strip support 38, one of the screws 44' extends through the slot 56, in each case, of the associated adjusting disk 54. As described above, the scraper strip 40 can be fixed on the scraper strip support 38 by means of the screw 44 engaging into the guide grooves 46 and by means of the particular nut 48. It is conceivable that flat washers, spring washers, or the like are additionally provided. The screws 44' extending through the adjusting disks 54, in turn, fix the particular adjusting means 54 with respect to the scraper strip support 38.

The function of the scraper device 36 will be described in greater detail in the following:

The scraper device 36 according to the exemplary embodiment shown in the drawing is used to counteract an adhesion of material, such as, for example, mud, crop material or crop material residue, dirt, etc., in order to thereby ensure an optimal function of the round baler 10 shown or, in particular, the roller 30'. As a result, a regular movement of the bale 12, for example, and/or a uniform feeding of a non-illustrated binding or covering material can be supported.

To this end, the scraper strip 40 extends as close as possible to the rotating roller 30' in order to thereby scrape off adhering material and/or to prevent adhesion. In order to ensure a good function of the scraper device 36, the spacing distance A between the scraper strip 40 and the roller 30' is displaceable.

If the objective is to reduce the spacing distance A if said spacing distance has become too great, for example, due to wear of the scraper strip 40, or because, for example, the crop material tyings have changed, the scraper strip 40 is moved towards the roller 30' or, in order to increase the spacing distance A, is moved away from said roller. It can be necessary to (re-) adjust the spacing distance when a new or an alternative scraper strip 40 is installed, or within the framework of maintenance.

To this end, the fastening means 42 are loosened, whereby the scraper strip 40 can be displaced relative to the scraper strip support 38. The screws 44 guide the scraper strip 40 in the guide grooves 46 in the longitudinal direction with respect to the operating direction of the round baler 10.

The scraper strip 40 and/or the adjusting means 54 can be gripped, for example, manually, for the actual adjustment of the scraper strip 40 with respect to the scraper strip support 38. Alternatively, a motor-driven and/or automatic adjustment is conceivable.

If the scraper strip 40 is displaced, the guide grooves 46 in the scraper strip 40 move along the screws 44 held in the scraper strip support 38. At the same time, the adjusting means 54 or the slots 58 in the adjusting disks 54 slide along the corresponding screws 44', whereby the adjusting disk 54 is set into rotation about its centre point M and rotates in the recess 56 in the scraper strip 40. Since the slots 58 extend from the centre point M of the adjusting means 54 generally eccentrically in the direction of the edge region 60 or, according to the exemplary embodiment depicted in the figures of the drawing, are designed in the form of a spiral extending from the centre point M in the direction of the edge region 60 or, more specifically, are designed in the shape of a circle involute, the rotation of one of the adjusting disks 54 results in a linear movement of the adjusting means 54 and, therefore, of the scraper strip 40.

As shown in FIG. 2, two adjusting disks 54 are provided. If the scraper strip 40 is displaced, the adjusting means 54 move at least substantially synchronously, whereby a displacement of the spacing distance A with respect to the roller 30' along the entire width B of the scraper strip can be achieved. It is also possible, however, to provide only one or multiple adjusting means 54. In addition, engagement points 62 can be provided on one or all of the adjusting means 54 for simplifying a manual or a motor-driven rotation of the adjusting means. These can be, for example, threaded nuts, into which a corresponding, non-illustrated screw can be screwed, which an operator can use as a grip.

The invention claimed is:

1. A scraper strip for a scraper device, comprising:
   a scraper strip body moveably attached to a scraper strip support;
   at least one adjusting disk positioned in a recess of the scraper strip body and comprising an eccentric guide track, which extends in a curved shape from a region at least close to a center point in the direction of an edge region of the adjusting disk, the adjusting disk rotatably attached to a scraper strip support via a guide positioned within the eccentric guide track to linearly displace the scraper strip body with respect to the scraper strip support when the at least one adjusting disk is rotated; and
   a first fastener connected to the scraper strip support and positioned in a guide groove of the scraper strip body, the guide groove extending substantially in a displacement direction of the scraper strip body, such that the scraper strip body is displaced with respect to the first fastener; and
   wherein the guide is coupled to the scraper strip support and configured to slide in the eccentric guide track of the adjusting disk when the adjusting disk moves, and wherein the guide allows the adjusting disk to rotate when the guide is in a first position and fixes the adjusting disk to the scraper strip support when the guide is in a second position.

2. The scraper strip of claim 1, wherein the eccentric guide track extends in one of a spiral shape and at least approximately as a circle involute.

3. The scraper strip of claim 1, wherein the at least one adjusting disk has a circular cross section and/or having a thickness substantially corresponding to a thickness of the scraper strip body.

4. The scraper strip of claim 1, wherein at least two adjusting disks are provided, which are disposed with mirror symmetry with respect to a longitudinal axis of the scraper strip body.

5. A scraper device for reducing adhesions on a roller which interacts with a bale of an agricultural round baler, comprising:
   a scraper strip including at least one adjusting disk positioned in a recess of the scraper strip and the at least one adjusting disk comprising an eccentric guide track, which extends in a curved shape, from a region at least close to a center point in the direction of an edge region of the adjusting disk, the adjusting disk rotatably attached to a scraper strip support via a guide positioned within the eccentric guide track to linearly displace the scraper strip with respect to the scraper strip support when the at least one adjusting disk is rotated; and
   a first fastener connected to the scraper strip support and positioned in a guide groove of the scraper strip, the guide groove extending substantially in a displacement direction of the scraper strip and configured to selectively couple the scraper strip to the scraper strip support, such that the scraper strip is displaced with respect to the first fastener; and
   wherein the guide is coupled to the scraper strip support and configured to slide in the eccentric guide track of the adjusting disk when the adjusting disk moves, and wherein the guide allows the adjusting disk to rotate when the guide is in a first position and fixes the adjusting disk to the scraper strip support when the guide is in a second position.

6. The scraper device of claim 5, wherein the first fastener is a screw connecting the scraper strip to the scraper strip support.

7. The scraper device of claim 5, wherein the eccentric guide track extends in one of a spiral shape and at least approximately as a circle involute.

8. The scraper device of claim 5, wherein the at least one adjusting disk has a circular cross section and/or having a thickness substantially corresponding to a thickness of the scraper strip.

9. The scraper device of claim 5, wherein at least two adjusting disks are provided, which are disposed with mirror symmetry with respect to a longitudinal axis of the scraper strip.

10. An agricultural round baler for producing round bales, comprising at least one movable component interacting with a bale, comprising:
    a scraper device including a scraper strip having at least one adjusting disk positioned in a recess of the scraper strip and the at least one adjusting disk comprising an eccentric guide track, which extends in a curved shape, from a region at least close to a center point in the direction of an edge region of the adjusting disk, the adjusting disk rotatably attached to a scraper strip support via a guide positioned within the eccentric guide track to linearly displace the scraper strip with respect to the scraper strip support when the at least one adjusting disk is rotated;
    a first fastener connected to the scraper strip support and positioned in a guide groove of the scraper strip, the guide groove extending substantially in a displacement direction of the scraper strip and configured to selectively couple the scraper strip to the scraper strip support, such that the scraper strip is displaced with respect to the first fastener;
    wherein the guide is coupled to the scraper strip support and configured to slide in the eccentric guide track of the adjusting disk when the adjusting disk moves, and wherein the guide allows the adjusting disk to rotate when the guide is in a first position and fixes the adjusting disk to the scraper strip support when the guide is in a second position.

11. The agricultural round baler of claim 10, wherein the eccentric guide track extends in one of a spiral shape and at least approximately as a circle involute.

12. The agricultural round baler of claim 10, wherein the at least one adjusting disk has a circular cross section and/or having a thickness substantially corresponding to a thickness of the scraper strip.

13. The agricultural round baler of claim 10, wherein at least two adjusting disk are provided, which are disposed with mirror symmetry with respect to a longitudinal axis of the scraper strip.

14. The agricultural round baler of claim 10, wherein the first fastener is a screw connecting the scraper strip to the scraper strip support.

15. The scraper strip of claim 1, wherein the guide is a second fastener.

16. The scraper strip of claim 1, comprising an engagment point positioned on a top surface of the adjusting disk and configured to be driven.

17. The scraper strip of claim 1, wherein the guide groove extends from an edge of the scraper strip body.

* * * * *